United States Patent [19]

Shihua

[11] Patent Number: 5,589,540
[45] Date of Patent: Dec. 31, 1996

[54] SYNTHESES OF NEW TYPES OF CHELATING RESINS AND THEIR ADSORPTION PROPERTIES FOR NOBLE METALS

[76] Inventor: Dong Shihua, 900 Frances way, #211, Richardson, Tex. 75081

[21] Appl. No.: 379,915

[22] Filed: Jan. 30, 1995

[51] Int. Cl.$^6$ ............................................. C08G 63/91
[52] U.S. Cl. ........................... 525/65; 525/55; 525/63; 525/66; 525/72; 423/24
[58] Field of Search ..................... 525/65, 55, 63, 525/66, 72; 423/24

[56] References Cited

PUBLICATIONS

Patent"Syntheses of chelate resin of mercapto–amine type by reaction of 2–(chloromethyl) thurane and diamine" Yuwu et al. 1987.
Journal "Syntheses and adsorption properties of chelating resins with amino and mercapto groups" Chaocan et al. 1993.
Journal "Study on chelating resins, XIX. Syntheses and adsorption properties of chelating resins based on chitosan." Yunhua et al. 1992.
Journal "Synthesis and adsorption properties of IPN chelating resins containing S and N atoms and their application to the separation of Re and Pt" Yuwu et al 1994.
Journal "Study on chelate resins, V. Synthesis of new chelating resins by the reaction of chloromethylthiirane with polyethylene–polyamine" Yuwu et al 1988.
Patent "Manufacture of amino polythioether chelating agents for noble metal separation" Yuwu et al 1989.

*Primary Examiner*—James J. Seidleck
*Assistant Examiner*—Duc Truong

[57] ABSTRACT

Three new types of chelating resins containing nitrogen and sulfur or oxygen atoms as coordination atom were synthesized by the reaction of a polymer bearing amino (—$NH_2$) or imino (=NH) groups as reaction sites with a substitutive derivative of epithiopropane or epoxypropane. These resins exhibited excellent adsorption properties for noble metals.

6 Claims, No Drawings

SYNTHESES OF NEW TYPES OF CHELATING RESINS AND THEIR ADSORPTION PROPERTIES FOR NOBLE METALS

TECHNICAL FIELD

This invention relates to compositions adapted to selectively adsorb noble metals and methods of making and using such compositions and, more particularly, to chelating resins that selectively adsorb noble metals and methods of making and using such resins.

BACKGROUND OF THE INVENTION

In 1967, G. Koster and G. Schmuckler published an article entitled: SEPARATION OF NOBLE METALS FROM BASE METALS BY MEANS OF A NEW CHELATING RESIN. In the article is a description of a synthesized resin having isothiourea groups that form a chelating group exhibiting an adsorption capacity for noble metals, platinum and gold. The resins described in this article have been determined to have an adsorption capacity in a ratio of gram of noble metal to gram of resin of 1.1 for gold, of 0.218 for palladium and of 0.488 for platinum. Because the described isothiourea groups are easily hydrolyzed, this resin is unstable in an alkaline medium.

In 1986, Patent No. CN 85,100,246 was issued in China. In this patent is described a series of aminoisopropyl mercaptan type cross-linked chelating resins. These resins were prepared by reacting 2-chloromethylthiirane with polyethylene polyamines. The adsorption capacity of the resins described in this patent is (g/g-resin): Au 1.0–1.1, Pd 3.0–4.5, Pt 4.0–5.0.

In 1990, S. H. Dong reported chelating resins bearing dithiocarbamate groups. The resins were synthesized by reacting carbon disulfide with a polymer containing secondary amino groups prepared from polyethylene. polyamine and 2-chloromethylthiirane. The adsorption capacity of the resins described in this article is up to (g/g-resin): Au 2.6, Pt 0.51. However, because the dithiocarbamate group is unstable in an acidic medium with a pH of 4 below. These resins are only used in an alkaline medium and a dilute acid.

This invention relates to the syntheses of a series of new chelating resins containing nitrogen and sulfur or oxygen atoms, which exhibited excellent adsorption properties for the noble metals such as gold(III), palladium(II), platinum(IV), silver(I), rhodium(III) and ruthenum(III). A fact worth mentioning is that adsorption capacity of them is more than that of the resins reported in the literature up to now. As for example, the capacity of the resin synthesized in this invention for noble metals is up to (g/g-resin): Au 2.6, Pd 0.9, Pt 0.6. The adsorption percentage of the most chelating resins for gold(III), palladium(II), and platinum(IV) are almost 100% from dilute solution containing noble metal, whereas for rhodium(III) and ruthenium(III) are 96.0% and 93.5% respectively. On the other hand, they exhibit high selectivity for noble metals, because of the adsorption ability of these resins for noble metals is strong, whereas for base metals is very weak. For example, from an aqueous solution containing gold(III), copper(II), iron(III), zinc(II), potassium(I) and sodium(I), only gold can be quantitatively adsorbed by the resin even though the concentration of these base metals is more than 15–50 times that of gold(III).

It is obvious that the chelating resins of this invention can be used effectively for separating, recovering and enrichment gold, palladium, platinum from industrial waste liquor or stock containing noble metals.

BRIEF DESCRIPTION OF THE INVENTION

The present invention is the syntheses of new types of chelating resins containing nitrogen and sulfur or oxygen atoms as coordination atom by the reaction of a polymer bearing amino (—$NH_2$) or imino (—NH) groups as reaction sites with a substituted derivative of epithiopropane or epoxypropane such as 2-chloromethylthiirane, 3-alkoxyl-1,2-epithiopropane, 3-N,N-dialkylamino-1,2-epithiopropane, 3-alkoxyl-1,2-epoxypropane and 3-N,N-dialkylamino-1,2-epoxypropane. These chelating resins exhibit high adsorption capacity and selectivity for noble metals such as gold(III), palladium(II), platinum(III), rhodium(III), ruthenium(III) and silver(I).

The first type of resin is a new kind of chelating resin of mercapto-amino type preparing by the ring opening reaction of a linear polymer with a bifunctional compound such as epichlorohydrin and 2-chloromethylthiirane. In this reaction, the bifunctional compound is not only used as a monomer, but also used as a crosslinking agent. So a certain amount of this compound is needed requirement, otherwise a good crosslinked polymer can not be formed. For example, if the mole ratio of 2-chloromethylthiirane to imino group (=NH) in the linear polyethylenimine is less than 1:20, a lower crosslinked polymer will be obtained in poor yield. The main structure of the resin GH-40 is shown as follows:

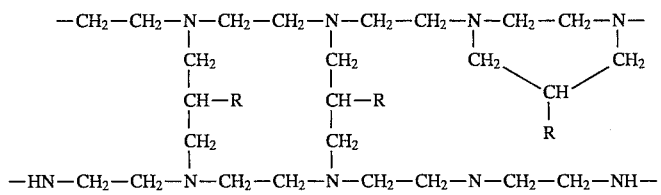

Wherein R is OH or SH.

The resulting polymer is a yellowish, crosslinked bead polymer. It is possessed of excellent adsorption property. The adsorption capacity for noble metals is (g/g-resin): Au 2.0–2.6; Pd 0.62–0.75; Pt 0.60–0.62 respectively. The capacity of the resin for gold increases with the increasing of the content of sulfur in the resin. From an acidic dilute solution (40–50 ppm) containing Au(III), Pd(II) or Pt(IV) the adsorption percentage is (%): Au~100; Pd 99.0–99.7; Pt 99.3–99.8.

A series of chemical modified chelating resin of GH-40 resin with 3-alkoxyl- 1,2-epithiopropane,3-N,N-dialkylamino-1,2-epithiopropane, 3-alkoxyl- 1,2-expoxypropane and 3-N,N-diakylamino-1,2-epoxypropane was also investigated. The main structure of the resins is shown as follows:

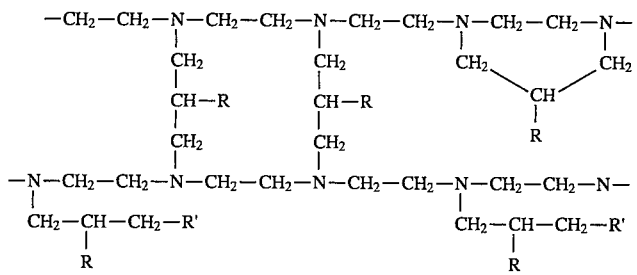

Wherein R is OH or SH; R' is —H; —OCH₃; —OC₂H₅; —OC₃H₇-n; —OC₄H₉-n; —N(C₂H₅)₂; —N(C₃H₇-n)₂; —N(C₄H₉-n)₂.

The adsorption capacity of these resins for noble metals is (g/g- resin): Au 0.87–12.5; Pd 0.43–0.71; Pt 0.23–0.61; Ag 1.2–7.1.

The second type of resin was prepared by the reaction of 2-chloromethylthiirane with amines such as ethylenediamine; diethylenetriamine; triethylenetetramine and tetraethylenepentamine, and linear polyethylenimine. Both of mercapto and amino groups were formed in the structure of resulting polymers.

The adsorption capacity for noble metals is (g/g-resin): Au 1.2–1.8; Pd 0.46–0.62; Pt 0.45–0.52, respectively.

The third type of resin was another chemical modified chelating resin, which was prepared from a macroporous crosslinked polyvinylbenzylamine beads and 3-alkoxyl-1,2-epithiopropane,3-N,N-dialkylamino-1,2-epithiopropane, 3alkoxyl-1,2-epoxypropane and 3-N,N-dialkylamino-1,2-epoxypropane. The main structure of these resins can be shown as follows:

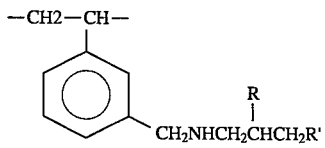

wherein R is OH or SH; R' is —H; —OCH₃; —OC₂H₅; —OC₃H₇-n; —OC₄H₉-n; —N(C₂H₅)₂; —N(C₃H₇-n)₂; —N(C₄H₉-n)₂.

The adsorption capacity of these resins for noble metals is (g/g- resin): Au 1.2–2.2; Pd 0.49–0.92; Pt 0.36–0.63; Ag 0.16–0.34.

The adsorption percentage of the resins in the invention from an acidic solution containing 10–100 ppm Au(III); Pd(II) or Pt(IV) is (%): Au ~100; Pd ~99–100; Pt ~90.3–100, respectively. All of resins described in the present invention exhibited high selectivity for noble metals. The adsorption ability of them for noble metals is strong, whereas for base metals is very weak. For example, from a mixed solution containing Au(III), Cu(II), Fe(III), Zn(II), K(I), only gold(III) is quantitatively adsorbed by GH-40,whereas the others are adsorbed hardly except zinc. It is obvious that the chelating resins of the present invention can be used effectively for separating and recovering gold, palladium and platinum from ores or industrial waster containing noble metals.

SPECIFIC EXAMPLE

Example I

Preparation of GH-40 Resin

Under a nitrogen atmosphere, 2.5 g of polyethylenimine (0.058 mole) in 50 ml of ethylene dichloride or ether and 1.26 g of epichloromethylthiirane (0.0116 mole)were mixed in a 100 ml three-necked flask equipped with a stirrer, a condenser and a thermometer at room temperature for 5 hrs. with stirring. The resulting polymer formed as granule was filtered, extracted with acetone. Then washed with ammonia liquor and distilled water sequentially. The polymer was dried in vacuum (i.e. 50° C./2–5 mmHg) until constant weight. 2.94 g(yield 78%) of GH-40 resin,as yellowish bead was obtained. Elemental analysis(%): S 8.95; N 20.64, Cl 0.

Example II

Preparation of GH-401 Resin

In a 100 ml three-necked flask equipped with a stirrer, a condenser and a thermometer was charged with 1.10 g of epithiopropane(0.015 mole), 0.6 g of sodium hydroxide(0.015 mole) and 1.0 g of GH-40 resin soaked in 10 ml of water overnight. The reaction mixture was stirred at room temperature for 0.5 hr., then sequentially heated to 40° C. for 9 hrs. The product was filtered, washed with distilled water until it was neutral, extracted with acetone, then dried in vacuum (i.e. 50° C./2–5 mmHg) until constant weight). 1.88 g(yield 90%) of GH-401 resin was obtained. Elemental analysis (%): S 24.2; N 11.5.

Example III

Preparation of GH-402 Resin

By the same method and condition as described in Example II of the present invention, 2.89 g (yield 90%) of GH-402 resin was obtained from 1.77 g of 3-ethoxy-1,2-epithiopropane (0.015 mole), 0.6 g of sodium hydroxide (0.015 mole) and 1.0 g of GH-40 resin soaked in 10 ml of water overnight. Elemental analysis (%): S 16.77; N 6.13.

Example IV

Preparation of GH-405 Resin

By the same method and condition as described in Example II of the present invention, 2.70 g (yield 86%) of GH-405 resin was obtained from 2.16 g of 3-(N,N-diethylamino)-1,2-epithiopropane (0.015mole), 0.6 g of sodium hydroxide (0.015 mole) and 1.0 g of GH-40 resin soaked in 10 ml of water overnight. Elemental analysis (%): S 15.6; N 13.7.

Example V

Preparation of GH-432 Resin

In a 100 ml four-necked flask equipped with a stirrer, a condenser, a dropping funnel and a thermometer was charged with 1.0 g of polyethylenimine (0.0233 mole NH group) and 3.15 g of epichloromethylthiirane (0.029 mole) in 30 ml of ethylene dichloride. After stirring under nitrogen atmosphere at room temperature for 5 hr. 1.2 g of diethylenetriamine (0.0117 mole) was added dropwise to the reaction flask with stirring at 15° C. for 5 hrs. The resulting polymer was filtered, extracted with acetone, then washed with ammonia liquor and distilled water sequentially. The product was dried in vacuum (i.e. 50° C. /2–5 mmHg) until constant weight. 4.9 g (yield 92%) of GH-432 resin was obtained. Elemental analysis (%): S 20.49; N 13.62.

Example VI

Preparation of GH-502 Resin

In a 100 ml four-necked flask equipped with a stirrer, a condenser, a dropping funnel and a thermometer was charged with 2.8 g of macroporous crosslinked polyvinylbenzylamine beads. Under nitrogen atmosphere, 1.82 g of 3-ethoxy-1,2-epithiopropane (0.015 mole) was added dropwise to the reaction flask with stirring at 50° C. for 8 hrs. The resulting mixture was cooled. The product was filtered, washed with distilled water, extracted with acetone, and then dried in vacuum (i.e. 50° C./2–5 mmHg) until constant weight. 4.6 g of GH-502 resin was obtained. Elemental analysis (%): S 10.69; N 4.14.

Example VII

Preparation of GH-505 Resin

By the same method and condition as described in Example VI of the present invention, 2.24 g of 3-(N,N-diethylamino)-1,2-epithiopropane (0.015 mole) was added dropwise to a flask charged with 2.8 g of macroporous crosslinked polyvinylbenzylamine beads. 4.99 g of GH-505 resin was obtained. Elemental analysis (%): S 9.12; N 8.23.

Example VIII

Preparation of GH-512 Resin

In 100 ml four-necked flask equipped with a stirrer, a condenser, a dropping funnel and a thermometer was charged with 2.8 g of macroporous crosslinked polyvinylbenzylamine beads. Under nitrogen atmosphere, 1.57 g of 3-ethoxy-1,2-epoxypropane (0.015 mole) was added dropwise to the reaction flask with stirring at 50° C. for 8 hrs., and then cooled. The polymer was filtered, washed with distilled water, extracted with acetone, then dried in vacuum (i.e. 50° C./2–5 mmHg) until constant weight. 4.2 g of GH-512 resin was obtained. Elemental analysis (% ): N 5.18.

Example IX

Preparation of GH-516 Resin

By the same method and condition as described in Example VIII of the present invention. 1.96 g of 3-(N,N-diethylamino)-1,2-epoxypropane (0.015 mole) was added dropwise to a flask charged with 2.8 g of macroporous crosslinked polyvinylbenzylamine beads. 4.71 g of GH-516 resin was obtained. Elemental analysis (%): N 9.06.

The invention having been described. what is claimed is:

1. A method of making a chelating resin adapted to selectively adsorb noble metals, comprising the step of reacting polyethyleneimine with at least one of the monomer selected from the group consisting of 2-chloromethylthiirane and epichlorohydrin.

2. A method of making a chelating resin adapted to selectively adsorb noble metals, comprising the step of reacting polyethylene polyamine with 2-chloromethylthiirane in the presence of polyethylenimine.

3. A method of making a chelating resin adapted to selectively adsorb noble metals, comprising the step of crosslinking polyvinylbenzylamine with at least one of the monomer corresponding to the formula:

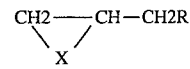

wherein: X is Sulfur or Oxygen; R is hydrogen, methoxy, ethoxy, n-propoxy, n-butoxy, diethylamino, di-n-propylamino and di-n-butylamino.

4. A method of making a chelating resin adapted to selectively adsorb noble metals, comprising the step of reacting a polymer of the following formula:

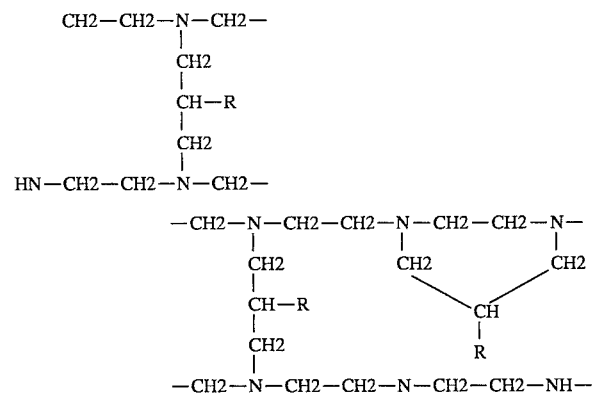

wherein: R is hydroxy or mercapto; with at least one of the monomer correponding to the formula:

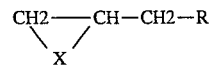

wherein: X is Sulfur or Oxygen; R is hydrogen, methoxy, ethoxy, n-propoxy, n-butoxy, diethylamino, di-n-propylamino and di-n-butylamino.

5. A chelating resin used to selectively adsorb noble metals, comprising a resin of the formula:

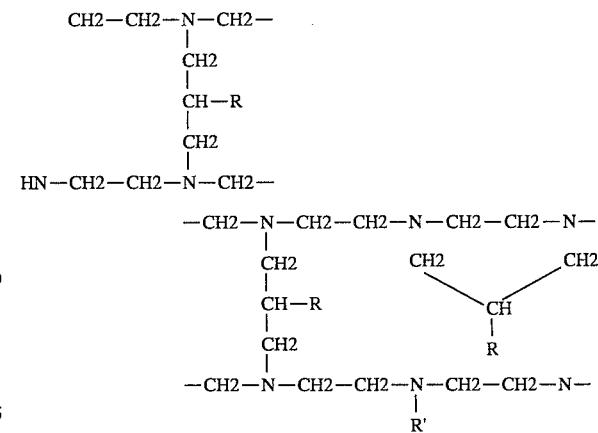

wherein: R is hydroxy or mercapto, R' is hydrogen or

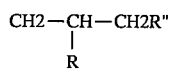

R" is hydrogen, methoxy, ethoxy, n-propoxy, n-butoxy, diethylamino, di-n-propylamino and di-n-butylamino.

6. A chelating resin used to selectively adsorb noble metals, comprising a resin of the Following formula:

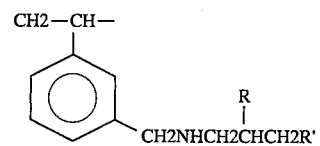

wherein: R is hydroxy or mercapto, R' is hydrogen, methoxy, ethoxy, n-propoxy, n-butoxy, diethylamino, di-n-propylamino and di-n-butylamino.

* * * * *